Patented Nov. 2, 1943

2,333,445

UNITED STATES PATENT OFFICE 2,333,445

HYDROXYAMINOBENZENESULPHON-AMIDES

Richard Owen Roblin, Jr., Old Greenwich, and George Washington Anderson, Stamford, Conn., assignors to American Cyanamid Company, New York, N. Y., a corporation of Maine No Drawing. Application August 14, 1941, Serial No. 406,930

9 Claims. (Cl. 260—251)

This invention relates to the production of 3,4-hydroxy benzene sulphonamido compounds and benzoxalone sulphonamido compounds. The compounds have the formula:

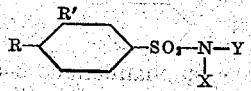

in which R is amino and R' is OH, or R and R' are part of an oxazolone ring, and X and Y may be hydrogen or a heterocycle.

The new compounds are prepared by the reaction of a benzoxazolone sulphonyl halide such as benzoxazolone sulphonyl chloride with ammonia or amines such as heterocyclic amines. The reaction produces the benzoxazolone sulphonamido compound which on heating with strong alkali is hydrolyzed to a 4-amino-3-hydroxy sulphonamido compound. The synthesis proceeds smoothly requiring for best results the presence of an acid binding substance in the step of reacting the benzoxazolone sulphonyl halide with the amine. The final products are useful as dyestuff intermediates.

The invention will be described in greater detail in conjunction with the specific examples which represent typical illustrations but do not limit the invention to the details therein set forth. The parts are by weight.

EXAMPLE 1

*Benzoxazolonesulphonylchloride*

199 parts of benzoxazolone are added in portions to 480 parts of chlorosulphonic acid with stirring at a temperature of 5° to 10° C. The solution is allowed to warm to room temperature, then heated on a steam bath for an hour. After cooling, it is poured on cracked ice. The solid product is filtered off and purified by precipitating out of acetone solution with water. The purified benzoxazolonesulphonyl chloride has a melting point of about 192–193° C.

EXAMPLE 2

*Benzoxazolonesulphonamide*

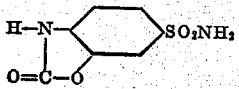

109 parts of benzoxazolonesulphonylchloride are slowly added to 300 parts of concentrated ammonium hydroxide with stirring. The precipitate which forms is filtered off after chilling, digested with acetone, and refiltered. The pure benzoxazolonesulphonamide has a melting point of about 271° C.

EXAMPLE 3

*3-hydroxysulphanilamide*

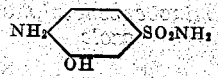

58 parts of benzoxazolonesulphonamide are refluxed for two hours with 580 parts of 10% sodium hydroxide solution. The resulting solution is cooled and made acid with concentrated hydrochloric acid. When carbon dioxide evolution has ceased, the solution is adjusted to neutrality with ammonium hydroxide and acetic acid before evaporating to dryness under vacuum. The solid residue is extracted with ethyl acetate and the product obtained by evaporating this solution to dryness is recrystallized from isopropyl alcohol with the use of animal charcoal. Pure 3-hydroxysulphanilamide has a melting point of about 166° C.

EXAMPLE 4

*Benzoxazolonesulphonamido-2-pyridine*

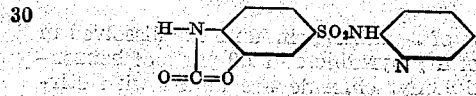

30 parts of benzoxazolonesulphonylchloride is added in portions to a solution of 12 parts of 2-aminopyridine in 50 parts of dry pyridine so that the temperature does not rise above 45° C. 100 parts of pyridine are added to the viscous mixture, the resulting solution is heated on a steam bath for about 40 minutes, cooled, and finally diluted to about 500 parts with water. Some gummy precipitate which forms is removed, and more is obtained by partial evaporation of the solution under vacuum. The combined precipitates are purified by digesting with acetone. Benzoxazolonesulphonamido-2-pyridine so obtained melts with decomposition at about 283°–295° C.

EXAMPLE 5

*3-hydroxy-4-aminobenzenesulphonamido-2-pyridine*

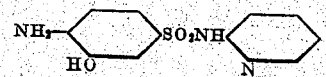

5 parts of benzoxazolonesulphonamido-2-pyridine are refluxed for two hours with 70 parts of a 10% solution of sodium hydroxide. The cooled solution evolves carbon dioxide when made acid with hydrochloric acid. It is adjusted to neutrality with alkali, whereat a precipitate forms. This is filtered off, washed with water, and recrystallized from isopropyl alcohol and absolute alcohol after drying. It has a melting point of about 257° C.

EXAMPLE 6

*Benzoxazolonesulphonamido-2-thiazole*

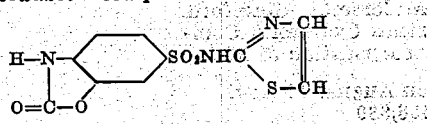

Two parts of 2-aminothiazole are dissolved in 10 parts of dry pyridine. To this is slowly added with stirring 5 parts of benzoxazolonesulphonylchloride. The temperature is not allowed to rise above 40° C. When the addition is complete, 10 parts of pyridine are added and the mixture is heated on a steam bath for about 30 minutes. Cooling causes some crystals of the product to form, and the addition of water produces more.

EXAMPLE 7

*3-hydroxy-4-aminobenzenesulphonamido-2-thiazole*

One part of benzoxazolone sulphonamido-2-thiazole is refluxed for two hours with 10 parts of a 10% solution of sodium hydroxide. The solution is then cooled and adjusted to neutrality with acid. The crude product which precipitates is purified by recrystallization from isopropyl alcohol.

EXAMPLE 8

*Benzoxazolonesulphonamido-2-pyrimidine*

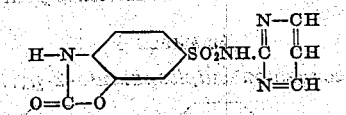

3.2 parts of 2-aminopyrimidine are dissolved in 10 parts of dry pyridine and 7.8 parts of benzoxazolonesulphonyl chloride are added with stirring so that the temperature does not rise above 45° C. The mixture is then warmed on the steam bath awhile, cooled, and diluted with water. The precipitate which forms is purified by digesting with acetone.

EXAMPLE 9

*3-hydroxy-4-aminobenzenesulphonamido-2-pyrimidine*

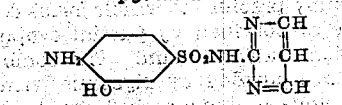

Three parts of benzoxazolonesulphonamido-2-pyrimidine are refluxed for two hours with 25 parts of 10% sodium hydroxide solution. The solution is then cooled and adjusted to neutrality with acid. The solid which precipitates is filtered off and purified by recrystallization from alcohol.

The above examples illustrate the preparation of typical sulphonamido compounds but it should be understood that the reaction is general. Thus in a similar manner 4- and 5-amino pyrimidines may be reacted to form the corresponding isomeric pyrimidine compounds and any other amines may also be used such as for example substituted amino pyridines, 3- and 4-amino pyridines and the like.

We claim:

1. 3-hydroxy sulphanilamido compounds having the following general formula:

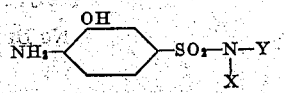

in which X and Y are members of the group consisting of hydrogen and heterocyclic radicals.

2. 3-hydroxy sulphanilamide of the following formula:

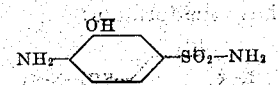

3. 3-hydroxy sulphanilamido-2-pyridine having the following general formula:

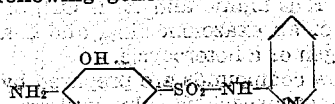

4. 3-hydroxy sulphanilamido-2-pyrimidine having the following formula:

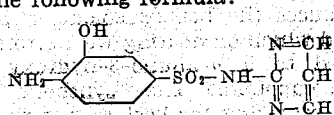

5. A method of producing a 4-amino-3-hydroxy benzene sulphanamido compound which comprises reacting a benzoxazolone p-sulphonyl halide with an amine and hydrolyzing the oxazolone group.

6. A method of producing a 4-amino-3-hydroxy benzene sulphonamido compound which comprises reacting a benzoxazolone p-sulphonyl halide with an amine and hydrolyzing the oxazolone group by heating in alkaline solution.

7. A method of making 3-hydroxy sulphanilamide which comprises reacting a benzoxazolone p-sulphonyl halide with ammonia and subjecting the compound produced to heating in an alkaline solution.

8. A method of making 3-hydroxy sulphanilamido-2-pyridine which comprises reacting a benzoxazolone p-sulphonyl halide with 2-amino pyridine and heating the compound in an alkaline solution.

9. A method of making 3-hydroxy sulphanilamido-2-pyrimidine which comprises reacting a benzoxazolone p-sulphonyl halide with 2-amino pyrimidine and heating the compound in an alkaline solution.

RICHARD OWEN ROBLIN, JR.
GEORGE WASHINGTON ANDERSON.